(12) United States Patent
Kapoor et al.

(10) Patent No.: US 8,354,615 B2
(45) Date of Patent: Jan. 15, 2013

(54) MANUAL WELDING ELECTRODE

(75) Inventors: Ashish Kapoor, Highland Heights, OH (US); Michael Morlock, Chesterland, OH (US)

(73) Assignee: Lincoln Global, Inc., City of Industry, CA (US)

(*) Notice: Subject to any disclaimer, the term of this patent is extended or adjusted under 35 U.S.C. 154(b) by 986 days.

(21) Appl. No.: 12/398,705

(22) Filed: Mar. 5, 2009

(65) Prior Publication Data

US 2010/0224611 A1    Sep. 9, 2010

(51) Int. Cl.
B23K 35/02    (2006.01)

(52) U.S. Cl. .............. 219/145.1; 219/145.41; 219/146.1

(58) Field of Classification Search .............. 219/145.1, 219/145.41, 146.1, 145.23; 428/560
See application file for complete search history.

(56) References Cited

U.S. PATENT DOCUMENTS

| | | | |
|---|---|---|---|
| 3,118,052 A * | 1/1964 | Lippart et al. ............ | 219/137 R |
| 3,627,574 A | 12/1971 | Delong et al. | |
| 3,769,491 A * | 10/1973 | De Long et al. .......... | 219/137 R |
| 4,650,951 A * | 3/1987 | Koga et al. ................. | 219/118 |
| 5,015,816 A * | 5/1991 | Bush et al. ................. | 219/119 |
| 5,300,754 A * | 4/1994 | Gonzalez et al. .......... | 219/146.3 |
| 5,688,420 A | 11/1997 | Gotoh et al. | |
| 6,037,559 A * | 3/2000 | Okabe et al. ............... | 219/91.23 |
| 6,403,913 B1 * | 6/2002 | Spinella et al. ............. | 219/119 |
| 6,672,942 B1 * | 1/2004 | Ikeda et al. ................. | 451/11 |
| 6,861,609 B2 * | 3/2005 | Sigler ......................... | 219/117.1 |
| 7,087,859 B2 * | 8/2006 | Burt et al. .................. | 219/145.1 |
| 2004/0187961 A1 * | 9/2004 | Crockett ..................... | 148/23 |
| 2005/0247688 A1 * | 11/2005 | Burt et al. ................. | 219/145.23 |
| 2006/0196919 A1 * | 9/2006 | James et al. ................ | 228/223 |
| 2006/0226138 A1 * | 10/2006 | James et al. ................ | 219/145.22 |
| 2006/0272746 A1 * | 12/2006 | Kapoor et al. .............. | 148/23 |
| 2006/0278627 A1 * | 12/2006 | Burt et al. ................. | 219/145.23 |
| 2007/0017956 A1 * | 1/2007 | Karogal ...................... | 228/101 |

OTHER PUBLICATIONS

The Lincoln Electric Company, Low Hydrogen Stick (SMAW) Electrode), Excalibur® 7018-A1 MR, dated Mar. 2009.

* cited by examiner

*Primary Examiner* — M. Alexandra Elve
(74) *Attorney, Agent, or Firm* — Hahn Loeser & Parks LLP

(57) ABSTRACT

An electrode for use in a welding process may comprise a finite length electrode core. The electrode core may be encapsulated at least partially within a coating comprising a flux material. One end of the electrode core may be tapered from a first diameter D to a second smaller diameter D1. The tapered end may further be covered with a coating that enhances the arc starting capabilities of the electrode.

16 Claims, 5 Drawing Sheets

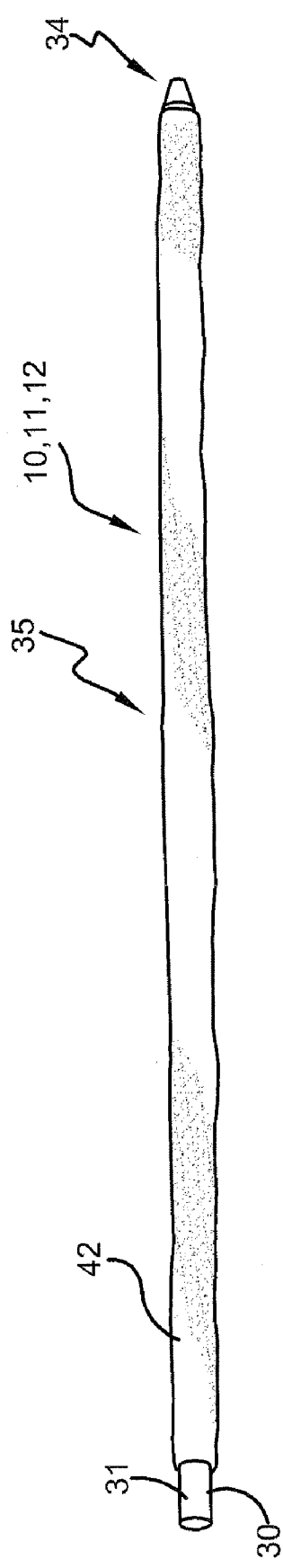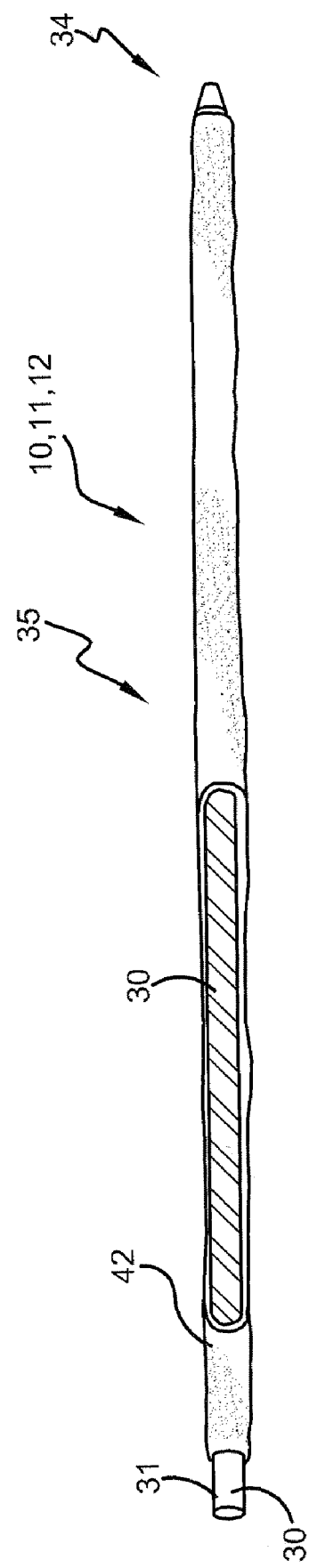

MANUAL WELDING ELECTRODE

TECHNICAL FIELD

The present invention pertains to manual welding electrodes, and more particularly, to manual welding electrodes having an electrode tip constructed to assist the welder in striking the arc.

BACKGROUND OF THE INVENTION

In any welding process, the welder must consider the type of material being joined together. In many applications, much of the material comprising the electrode combines with the weldment components affecting its properties. It can be important to select an electrode that corresponds to the base material properties. Accordingly, electrodes are categorized by their properties, primarily tensile strength. Other electrode classifications relate to the types and amounts of metal alloys incorporated into the electrode, as well as the welding position in which the electrode is capable of making a satisfactory weld.

Electrodes also introduce impurities or other undesirable substances into the weld joint. Some electrodes are constructed to contain moisture, which may come in the form of a cellulose coating. Moisture bolsters the arc force and increases weld penetration. However, hydrogen from the moisture is also introduced into the weld joint. For high tensile strength materials, the hydrogen acts like a small fissure leading to cracks in the weld. Pressurized containers are especially vulnerable to these effects. Pipelines are just one example of where it is critical to minimize the amounts of hydrogen added to the weld joint.

New welders, using a stick electrode, are taught to strike an arc by "scratching" the surface of the weld metal. This motion initiates the arc while avoiding "sticking" where the electrode fuses to the weldment. The scratching technique elongates the arc until the welder can move the electrode in closer to the work piece. This draws in air, which adds porosity to the weld joint.

BRIEF SUMMARY

The embodiments of the present invention pertain to manual welding electrodes, which may be used in an SMAW or other welding process. The welding electrode may be configured to improve the starting characteristics of the welding electrode while initiating the welding arc. In particular, methods and devices of the embodiments of the subject invention relate to an electrode configuration that increases the current density of the starting arc.

BRIEF DESCRIPTION OF THE DRAWINGS

FIG. 2 is a perspective side view of a welding electrode according to the embodiments of the subject invention.

FIG. 2a is a partial cutaway, perspective side view of a welding electrode according to the embodiments of the subject invention.

DETAILED DESCRIPTION OF THE INVENTION

Figure 1:
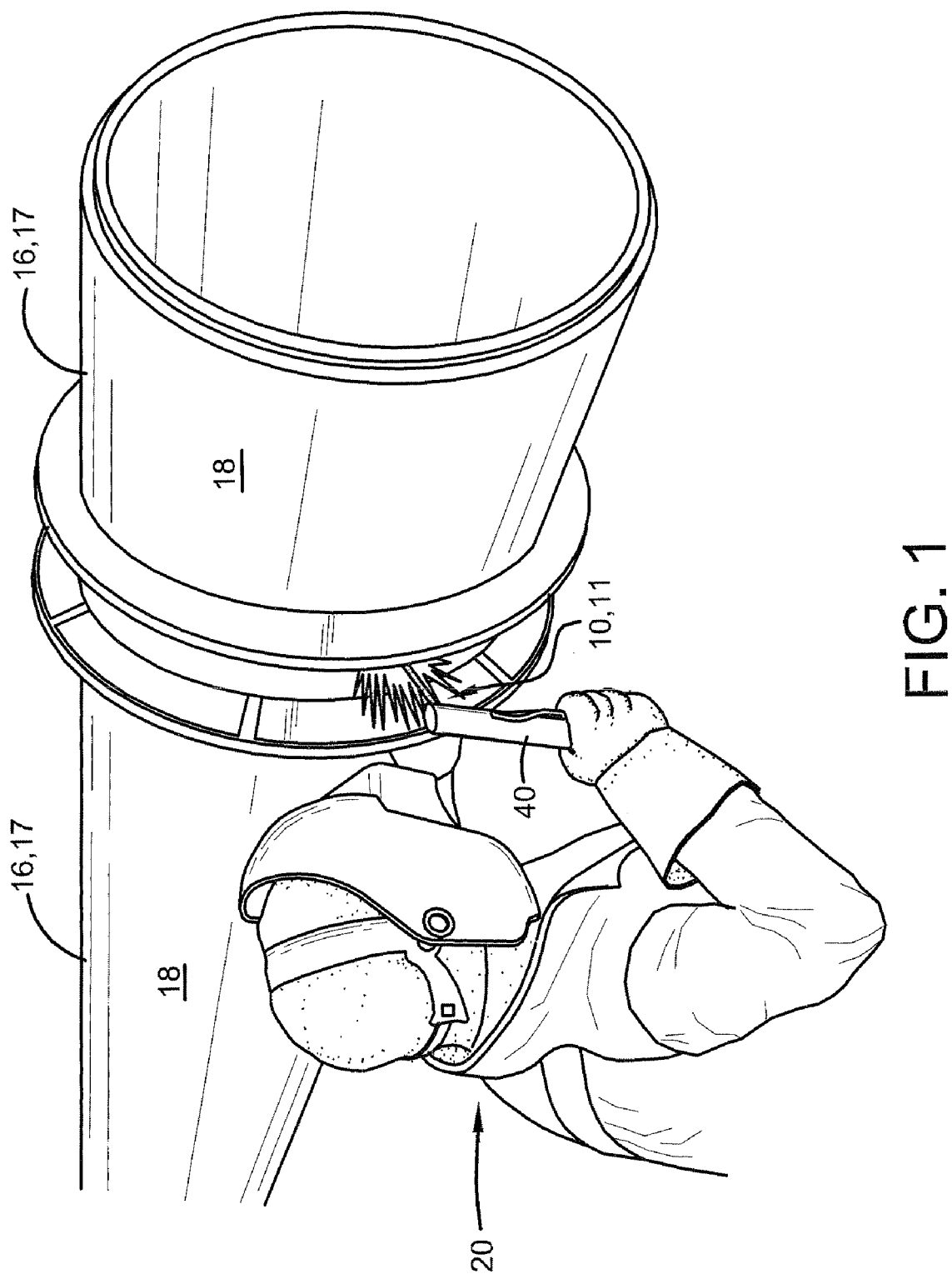
FIG. 1 is a perspective view of an end user welding components together according to the embodiments of the subject invention.

Referring now to the drawings wherein the showings are for purposes of illustrating embodiments of the invention only and not for purposes of limiting the same, FIG. 1 shows a welder 20 welding with a manual electrode depicted generally at 10. In one embodiment, the welder 20 is welding an article 16 having relatively high tensile strength. One example of such an article is a pipeline 17, which may be welded together from individual pipe sections 18 made of steel. Other welding applications and materials, high tensile strength or otherwise, will be realized by persons of ordinary skill in the art. To weld the article 16, the welder 20 may use a low hydrogen content electrode 11. This type of electrode 11 introduces less hydrogen into the weld joint, which reduces voids in the weld joint, as will be discussed further in a subsequent paragraph. Other types of manual electrodes 12 may incorporate cellulose, which may be added to increase arc force. Still, any type of electrode 10 may be used in accordance with the embodiments described herein as is appropriate for a particular welding application.

With continued reference to FIG. 1 and now also to FIGS. 2 and 2a, the electrode 10 may be comprised of a base metal 30, defining the electrode core 31. The length of the electrode core 31, and also the overall length of the electrode 10, may be in the range between substantially 10 inches to 16 inches. More specifically, the electrode length may be approximately 12 inches or 14 inches, with variances of up to $\frac{1}{16}$ inch. Still, any length of electrode 10 may be chosen with sound engineering judgment. In the case of Shielded Metal Arc Welding, also termed SMAW, the electrode core 31 may be constructed from solid metal, which may be drawn material. The electrode core 31 may also be constructed from cast material or even metal powders encased in a metallic sheath. The electrode core 31 may possess a substantially uniform cross section along the entire length of the electrode 10, which may be generally circular. The metal electrode core 31 functions to conduct current originating from a welding power source, not shown, as channeled through welding cables, also not shown, and the electrode holder 40, shown in FIG. 1. As the welding arc is initiated, current flows through the electrode core 31 and across the gap between the electrode 10 and the work piece 16. The metal becomes fluid and transfers across the gap to the weldment in a process well known in the art. To assist the welder 20 in striking the welding arc, one end 34 of the electrode 10 may be tapered. More specifically, the electrode core 31 may be tapered. That is to say that the diameter D of the body 35 of the electrode 10 narrows to a smaller diameter D1 at its end 34, which will be discussed further below. It will be appreciated by persons of skill in the art that the starting current density through the tapered end 34 of the electrode 10, also referred to as the tip 34, is increased due to the narrowed region, making it easier for the welder 20 to strike the arc.

With continued reference to FIGS. 2 and 2a, electrode 10 may be covered with a coating 42. The coating 42 may function to provide fluxing agents to clean the weld, as well as shield gas to prevent excessive atmospheric contamination. Additionally, the coating 42 may add alloying metals to the weld joint. As such, the coating 42 may include various metals as the alloying agent, deoxidizers and fluxing agents, and other elements, like for example potassium, which readily ionizes for enveloping the weld area with shielding gas. Other compounds may also be included as is appropriate for establishing and maintaining a welding arc. In one embodiment, the coating 42 may be particulate in nature. The coating 42 may comprise powder, or other forms of particulates, adhered to the electrode core 31. The coating 42 may be applied to the electrode core 31 in an extrusion process. Alternatively, the electrode core 31 may be repeatedly dipped into a slurry wherein the coating 42 is applied to the electrode core 31 in layers. Still, any manner of applying the coating 42 onto the electrode core 31 may be chosen with sound engineering judgment.

As previously mentioned, the electrode 10 may have a generally low content of hydrogen. In particular, the coating 42 may have a generally low content of hydrogen. One way of characterizing the hydrogen content compares the volume of hydrogen introduced into the weld joint per a given mass of weld metal, and more specifically per 100 g (grams) of weld metal. An electrode 10 depositing hydrogen in the amounts less than 5 mL per 100 g of weld metal is considered as having a low content of hydrogen. Alternatively, an electrode 10 depositing between 5 mL and 10 mL of hydrogen per 100 g of weld metal may also be considered as having a generally low content of hydrogen.

Figure 3:
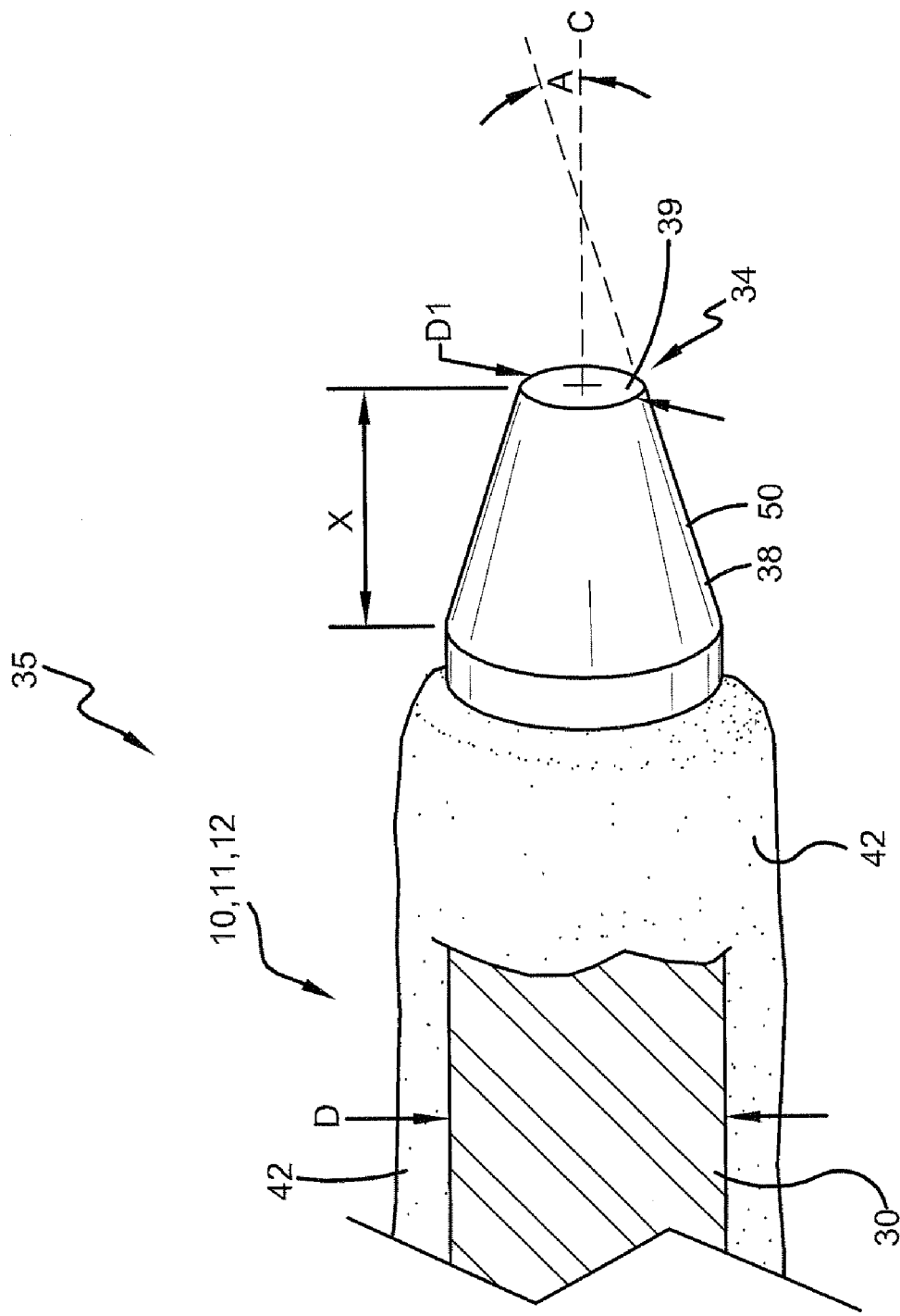
FIG. 3 is a close up perspective view of one end of the electrode according to the embodiments of the subject invention.
Figure 4:
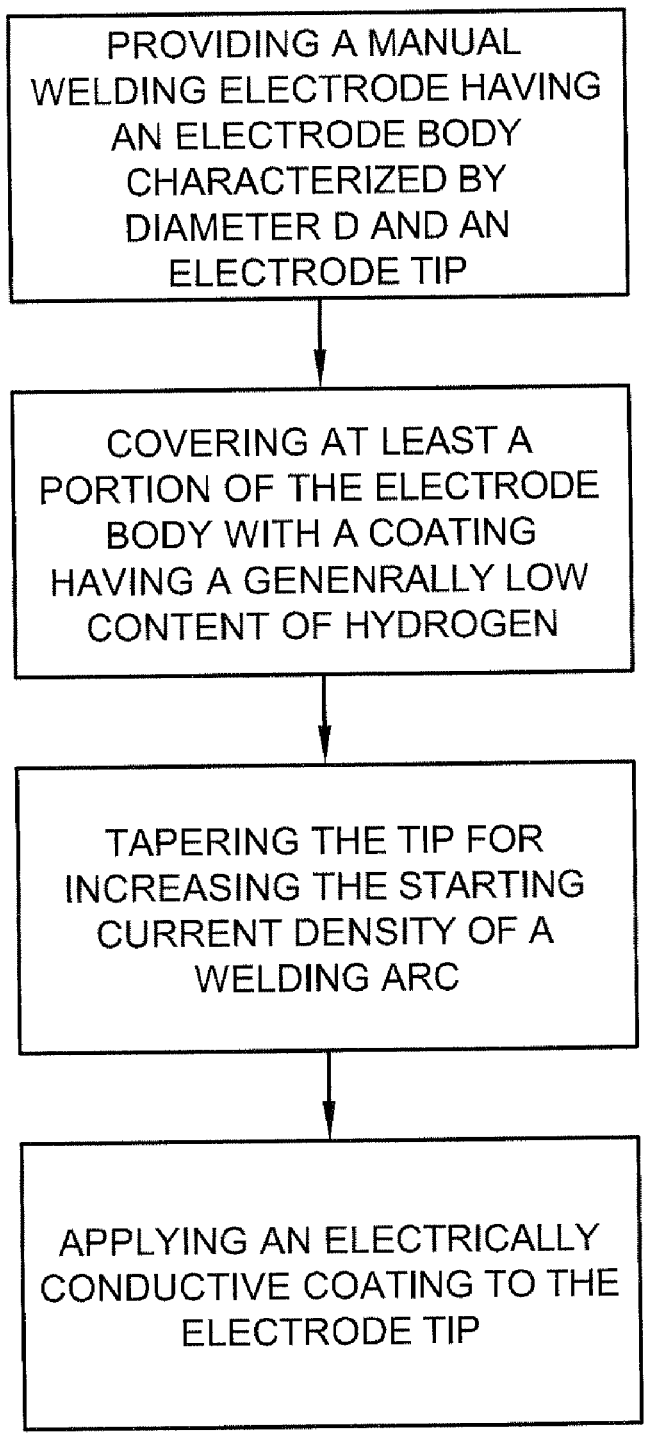
FIG. 4 is a block diagram of a method of fashioning a manual welding electrode according to the embodiments of the subject invention.
Figure 5:
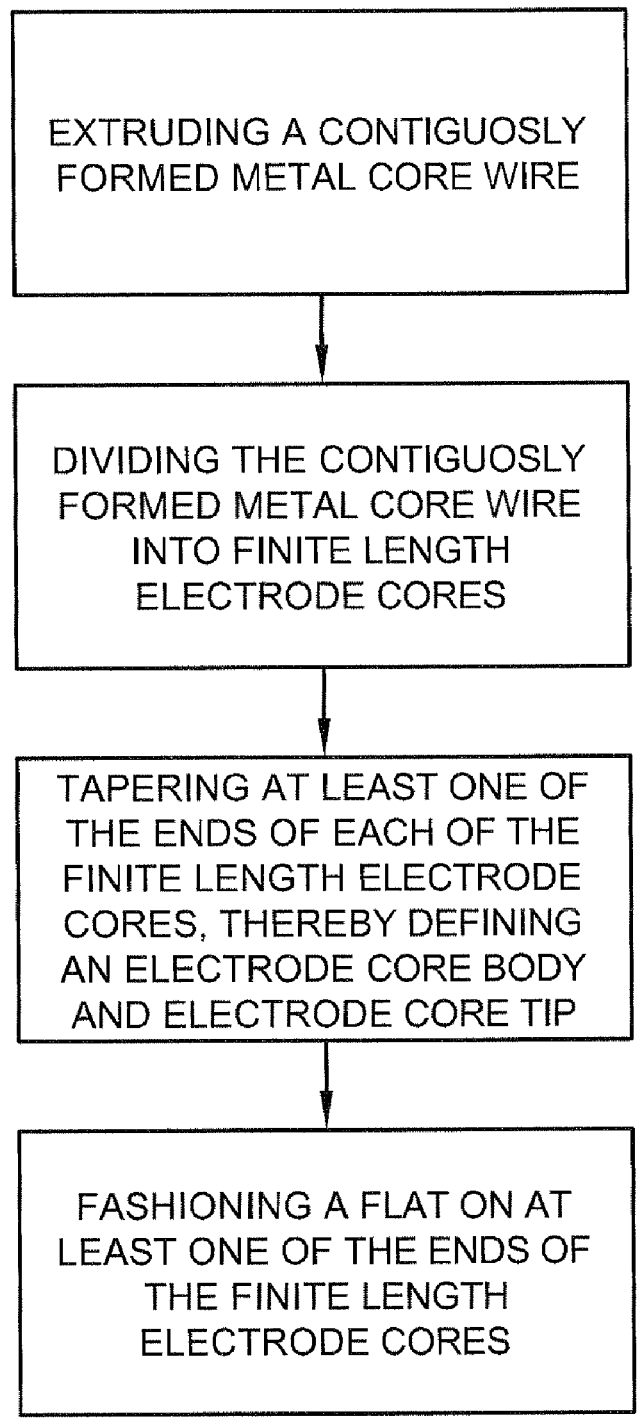
FIG. 5 is a block diagram of a method of manufacturing a manual electrode according to the embodiments of the subject invention.

With reference now to FIG. 3, as mentioned above the electrode core 31 may be tapered to improve the arc starting characteristics of the electrode 10. In one embodiment, the region around the tip 34 of the electrode 10 may be uniformly tapered from a diameter D, which may be the diameter of the body 35 of the electrode 10, to a smaller diameter D1. Stating it another way, the taper of the tip 34 may be angled inward at a constant slope with respect to a centerline axis C of the electrode core 31. It is to be construed that curved or other non-linear slopes also fall within the scope of coverage of the embodiments of the subject invention. In one embodiment, the diameter D1 of the tip 34 may reside in the range substantially between 0.025 and 0.125 inch. More specifically, the diameter D1 may be in the range between 0.039 inch and 0.052 inch. In one embodiment, the diameter D1 is substantially 0.045 inch. The axial distance X of the tapered region 38 may be limited to a region proximal the end 34 of the electrode 10. Accordingly, the axial distance X of the tapered region 38 may fall between 0.125 inch and 0.500 inch. In one exemplary manner, the axial distance X may be 0.1875 inch or 0.375 inch. It is noted here that the axial distance X may vary respective of the overall length of the electrode 10. For example, the axial distance X may be substantially 0.1875 inch for an electrode having an overall length of 12 inches. Similarly, the axial distance X of a 14 inch electrode may be 0.375 inch. Still, any axial distance X may be chosen as is appropriate for use with the embodiments of the present invention. It follows that the angle A of the slope may vary between the diameters D and D1 depending on the length of the tapered region 38. In fact, any slope may be incorporated that coincides with the other electrode dimensions as described above. It should be noticed that the face 39 of the electrode 10 may be substantially flat. This may be useful during the manufacturing process as will be discussed next.

The electrode 10 may be fabricated via an extrusion or alternatively by way of a machining process. More specifically, the electrode core 31 may be manufactured via extrusion. Contiguously formed metal core wire, as delivered by a supplier, may be drawn down to the desired diameter D in a manner consistent with that described above. In one exemplary process, the core wire may be drawn down in a cold drawing operation. However, hot drawing or other forms of extrusion may be incorporated without departing from the intended scope of coverage of the embodiments of the subject invention. Subsequently, the extruded core wire may be cut to a predefined length, which may be 12 inches or 14 inches as described above. In one embodiment, the extruded core wire may be sheared to length. Another process of cutting the core wire to length may include sawing. Still any process or manner of fashioning the extruded core wire into lengths suitable for manufacturing an electrode 10 as described herein may be chosen with sound engineering judgment. In this manner, the electrode core 31 and consequently the electrode 10 may be characterized as having a finite length. This is contrasted to other welding processes utilizing a continuously fed electrode such as are wound onto a spool or drum.

Once the extruded core wire has been cut to length, the tapered region 38 may then be shaped in a subsequent process, which may include abrasion techniques. In one embodiment, the tip 34 of the electrode core 31 is fashioned via grinding. Other processes may include coining or cold stamping. Still any manner of forming the tip 34 of the electrode core 31 may be chosen as is appropriate for use with the embodiments of the subject invention. As noted earlier, the face 39 of the electrode 10 may be substantially flat. That is to say that the tip 34 of the electrode 10 is generally planar. It is to be construed that generally planar may also refer to surfaces having a relatively large radius of curvature. Although, a curved face 39 should not be construed as falling outside the scope of coverage of the embodiments of the subject invention. The face 39 of the electrode 10 may also be generally perpendicular with respect to a centerline axis C of the electrode 10. In this way, as the electrodes 10 travel consecutively down the manufacturing line, the first end, i.e. the face 39, of one electrode 10 may abut the second end of a preceding electrode 10. The electrodes 10 are therefore forced or propelled along the manufacturing line as subsequent electrodes 10 are cut and shaped.

With reference again to FIG. 3, the tip 34 of the electrode 10 may be coated to assist the operator in initiating the welding arc. By assisting the operator it is meant that the arc striking capabilities of the electrode 10 are enhanced by the application of an electrically conductive substance 50. The electrically conductive substance 50 may be applied to the tapered region 38 and/or face 39 of the tip 34 of the electrode 10. It is contemplated in alternate embodiments that any portion of the electrode core 31 and/or any portion of the electrode 10 may be covered with the electrically conductive substance 50. In one embodiment, the electrically conductive substance 50 may be electrically charged. In one embodiment, the electrically conductive substance 50 comprises silicate. The electrically conductive substance 50 may also comprise graphite. Other embodiments are contemplated where the silicate is combined with graphite or other electrically conductive material. Still, any compound suitable for enhancing the arc starting properties may be applied to the electrode 10. In this manner, the electrically conductive substance 50 comprises an electrically conductive exterior electrode surface for assisting the operator in striking the arc.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A finite length welding electrode for shielded metal arc welding with improved arc striking capabilities while minimizing said electrode sticking to a weldment during arc initiation through at least a higher current density for starting the welding arc for the welding of high tensile strength weldments, comprising:
- an electrode core comprising an electrode core body having a diameter D and an electrode core tip having a diameter D1;
- a low-hydrogen electrode coating adhered to the electrode core body; and,
- wherein the electrode core tip narrows from the diameter D to a smaller diameter D1, and further wherein
- the electrode core tip is substantially centered about a centerline axis of the electrode core body, and wherein the electrode core tip tapers at a substantially constant slope with respect to the centerline axis of the electrode core body,
- said electrode core tip taper coated with an electrically conductive substance comprising at least one of a silicate or graphite, and
- a face of the electrode core is substantially planar.

2. The welding electrode as defined in claim 1, wherein the diameter D1 is in a range between 0.025 inch and 0.125 inch.

3. The welding electrode as defined in claim 1, wherein the diameter D1 is substantially 0.045 inch.

4. The welding electrode as defined in claim 1, wherein the welding electrode has a solid metal electrode core.

5. The welding electrode as defined in claim 1, wherein the low-hydrogen electrode deposits hydrogen in an amount of less than 5 ml per 100 grams of weld metal.

6. The welding electrode as defined in claim 1, wherein the low-hydrogen electrode deposits hydrogen in an amount of less than 4 ml hydrogen per 100 grams of weld metal.

7. The welding electrode as defined in claim 1, wherein the electrode core is
- constructed in an extrusion process.

8. A method of fashioning a manual finite length welding electrode for shielded metal arc welding with improved arc striking capabilities while minimizing said electrode sticking to a weldments during arc initiation through at least a higher current density for starting the welding arc for the welding of high tensile strength weldments, comprising the steps of:
- providing a manual welding electrode having an electrode body characterized by a diameter D and an electrode tip;
- covering at least a portion of the electrode body with a coating having a generally low content of hydrogen; and,
- tapering the electrode tip for increasing the starting current density of a welding arc, the electrode core tip substantially centered about a centerline axis of the electrode body, and wherein the electrode tip tapers at a substantially constant slope with respect to the centerline axis of the electrode, and
- applying an electrically conductive substance to the electrode tip, wherein said electrically conductive substance comprises at least one of a silicate and a graphite.

9. The method as defined in claim 8, wherein the manual welding electrode deposits less than 5 ml of hydrogen per 100 grams of weld metal.

10. The method as defined in claim 8, wherein the step of tapering the electrode tip for increasing the starting current density of the welding arc, comprises the step of:
- tapering the electrode tip to a diameter D1, wherein D1 is substantially in the range between 0.039 inch and 0.052 inch.

11. The method as defined in claim 8, wherein the step of tapering the electrode tip, comprises the step of:
- tapering the electrode tip to a diameter of substantially 0.045 inch.

12. The method as defined in claim 8, wherein the electrically conductive substance is electrically charged.

13. A stick welding electrode for shielded metal arc welding with improved arc striking capabilities while minimizing said electrode sticking to a weldment during arc initiation through at least a higher current density for starting the welding arc for the welding of high tensile strength weldments, comprising:
- a solid extruded electrode core comprising an electrode core body having a larger diameter D and an electrode core tip having a smaller diameter D1, wherein the diameter D1 is in a range between 0.025 inch and 0.125 inch;
- a low-hydrogen electrode coating adhered to the electrode core body, wherein the low-hydrogen electrode deposits hydrogen in an amount of less than 5 ml per 100 grams of weld metal;
- the electrode core tip is substantially centered about a centerline axis of the electrode core body, and wherein the electrode core tip tapers at a substantially constant slope with respect to the centerline axis of the electrode core body;
- said electrode core tip taper coated with an electrically conductive substance comprising a silicate; and
- a face of the electrode core is substantially planar.

14. The stick welding electrode of claim 13 wherein said electrically conductive substance further comprises graphite.

15. A stick welding electrode for shielded metal arc welding with improved arc striking capabilities while minimizing said electrode sticking to a weldment during arc initiation through at least a higher current density for starting the welding arc for the welding of high tensile strength weldments, comprising:
- a solid extruded electrode core comprising an electrode core body having a larger diameter D and an electrode core tip having a smaller diameter D1, wherein the diameter D1 is in a range between 0.025 inch and 0.125 inch;
- a low-hydrogen electrode coating adhered to the electrode core body, wherein the low-hydrogen electrode deposits hydrogen in an amount of less than 5 ml per 100 grams of weld metal;
- the electrode core tip is substantially centered about a centerline axis of the electrode core body, and wherein the electrode core tip tapers at a substantially constant slope with respect to the centerline axis of the electrode core body;
- said electrode core tip taper coated with an electrically conductive substance comprising a graphite; and
- a face of the electrode core is substantially planar.

16. The stick welding electrode of claim 15 wherein said electrically conductive substance further comprises silicate.

* * * * *